United States Patent [19]

Long et al.

[11] 4,160,806

[45] Jul. 10, 1979

[54] MOBILE CATALYST TREATMENT UNIT

[76] Inventors: Warner D. Long, 9112 Tiverton Way, Louisville, Ky. 40223; Charles C. Hager, Rt. 1, Box C F80, Crestwood, Ky. 40014; George T. Hempenstall, 11104 Berwick Pl., Middletown, Ky. 40243

[21] Appl. No.: 795,121

[22] Filed: May 9, 1977

[51] Int. Cl.² ............................ B01J 8/02; B01J 37/12; F25D 15/00
[52] U.S. Cl. .................................... 422/223; 62/237; 165/41; 208/146; 208/370; 252/411 R; 252/416; 422/111; 422/235
[58] Field of Search .............. 23/288 B, 260; 208/140, 208/146, 370; 62/237; 165/41; 280/79.1 R, 79.2; 422/144, 223, 234, 35 (U.S. Only), 62, 105, 111, 187, 198, 211

[56] References Cited
U.S. PATENT DOCUMENTS

| | | | |
|---|---|---|---|
| 2,303,867 | 12/1942 | Stebbins | 62/237 X |
| 2,347,763 | 5/1944 | Bixby | 23/260 |
| 2,791,401 | 5/1957 | Harslem et al. | 62/237 X |
| 2,989,462 | 6/1961 | Haxton et al. | 208/140 |
| 3,166,381 | 1/1965 | Loss | 23/288 B |
| 3,914,955 | 10/1975 | McCullough | 62/237 |

*Primary Examiner*—Joseph Scovronek
*Attorney, Agent, or Firm*—Price and Caslin

[57] ABSTRACT

A mobile catalyst treatment unit and process of operating same involves a closed gas processing loop supported on a normally mobile carrier such as a flat truck bed or trailer which is connectable with the inlet and outlet of a catalytic reactor. The normal process gas is cut off from the catalytic reactor so as to isolate the catalyst and to place the gas processing loop into communication with the reactor. Thereafter, the catalytic reactor can be purged of reducing gases and then treated with an oxidizing gas to burn off carbonaceous materials from the catalyst surface, in the process known as regeneration, or the catalyst can be treated with a reducing gas in the process known as reduction, or the catalyst can be heated for startup purposes, or cooled down for purposes of unloading or other mechanical work on the reactor or treated with other treatment gases such as hydrogen sulfide for sulfiding and the like. The advantage of the equipment and the process is that the catalyst can be treated without the entire plant being in operation. Accordingly, the catalytic reactor is in condition to go directly on stream, thus reducing down time and increasing the production time.

11 Claims, 2 Drawing Figures

MOBILE CATALYST TREATMENT UNIT

FIELD OF THE INVENTION

This invention relates to an apparatus and process for treatment of catalysts. More specifically, this invention relates to a mobile catalyst treatment unit designed specifically for treating the catalyst in a catalytic reactor to produce a desired physical or chemical change therein without the need of placing the whole, or part of the plant, in operation. More particularly, this invention relates to an automatic on-site apparatus and process for heating, cooling, regenerating, reducing, oxidizing or chemically treating catalysts in situ in the catalytic reactor after the catalyst has been isolated from the normal process gases.

BACKGROUND OF THE INVENTION

There have been many processes proposed by which catalysts in a catalytic reactor can be activated, deactivated, heated, or cooled in situ in the catalyst beds. However, insofar as the inventors are aware, in all these cases, the plant must be operating either totally or partly in order to accomplish this. As a result, considerable time and production are thus lost by the plant in having to heat, activate or deactivate catalysts, particularly after a plant shutdown, since production cannot be made until these steps are taken. The scope of this problem can be appreciated, when it is considered that plant production may be worth in the neighborhood of several hundred thousand dollars or more per day. Further, many of these processing steps require two to three days to place the catalyst in proper condition for process use. Accordingly, by use of the process and of the apparatus of this invention, the catalyst can be prepared so as to be ready to go on stream immediately, thus conserving otherwise wasted time in placing the plant into production.

SUMMARY OF THE PRIOR ART

Insofar as the inventors are aware, essentially all processes for placing catalytic reactors on stream have involved the normal process stream or permanently installed treatment facilities. Thus, it is necessary in order to reduce the catalyst, for example, to get the plant into some semblance of operation, at least to a sufficient gas production to allow for reduction of the catalyst. Some proposals have included, for example, an accessory gas loop. Note, for example, U.S. Pat. No. 3,609,097 to Koppe, who proposes an accessory gas treatment loop in which a steam injector is used as a carrier gas for the air normally used in regeneration of the catalyst. Further, in U.S. Pat. No. 3,888,764, Greenwood proposes a method of purging hydrogen and hydrocarbonaceous material from catalyst particles in a hydrogenative hydrocarbon conversion process and as background describes a series of proposals made in the past for the regeneration and purging of such catalysts.

Insofar, however, as the inventors are aware, a mobile catalyst treatment unit has not been proposed. A review of the patent literature indicates only a mobile method of air pollution control suitable for scrubbing exhaust stacks as disclosed by Brooks in U.S. Pat. No. 3,719,028. Nevertheless, substantial economies can be made through the use of the apparatus and process of this invention by placing the catalyst into condition to go on stream immediately or to go off stream immediately as the case might be without the necessity of utilization of the existing plant facilities and possibly the entire plant.

SUMMARY OF THE INVENTION

According to this invention, there is provided a gas processing loop supported on a normally mobile carrier which can be placed into open communication with the inlet and outlet of a catalytic reactor so as to establish a through fluid channel herewith. Serially connected in said gas loop may be included a heater, a cooler, a water removal means, a blower, or compressor, and a method of injection of a gas treatment fluid into said loop. The normal process flow is cut off through the use of valves and/or blinds which are normally available in the process flow so that the catalyst bed is isolated from the process gases. Thereafter, if indicated, the process gases are purged from the reactor, the gases are cooled or heated as the case might be, and the catalyst temperature is modified to that desired and required by the step taken. The treatment gases are injected in the precise quantities and flow rates as required and the entire treatment step is effected without the necessity of operating the plant. After these steps are completed, the gas processing loop is disconnected from the inlet and outlet and the catalytic reactor is made available to the normal process lines, ready for plant operation or start up.

BRIEF DESCRIPTION OF THE DRAWINGS

This invention will be better understood by reference to the attached drawings in which.

DESCRIPTION OF THE PREFERRED EMBODIMENT

Figure 1:
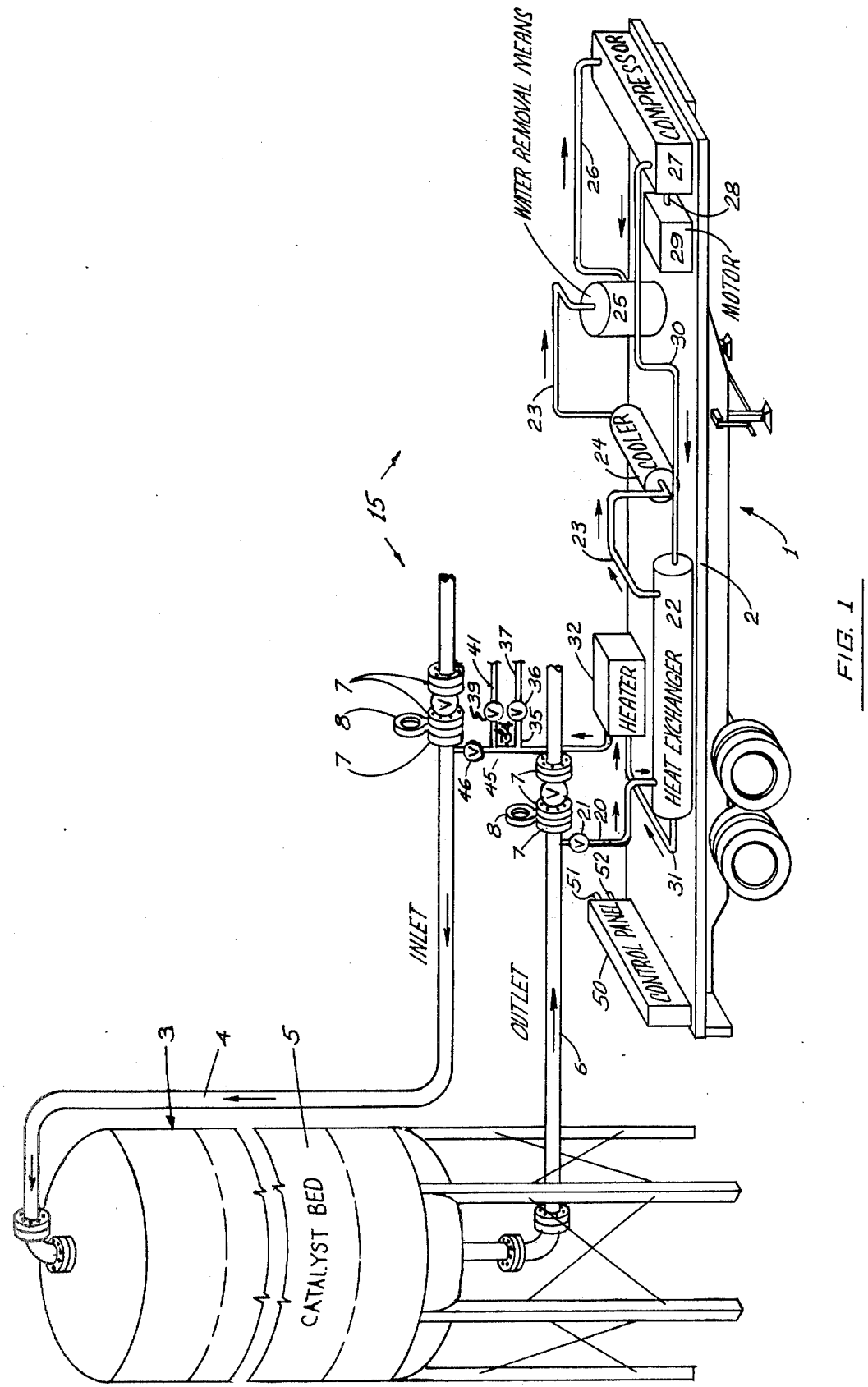
FIG. 1 is a view in perspective of the mobile catalyst treatment unit of this invention, in operative relation to a catalytic reactor.

Referring now to the drawing, and specifically to FIG. 1, the mobile catalyst unit 1 is shown mounted on the bed of a trailer 2. The tractor has been pulled away for clarity of illustration. The catalytic reactor 3 is shown with the inlet line 4, the catalyst bed 5 and the outlet 6. The inlet and outlet are both cut off from the normal process by insertion of a blind 8 between flanges 7. These blinds are normally provided in a catalytic petrochemical plant for protection of the workers so that it is not necessary to rely on a valve up or downstream therefrom. However, normally, the valve and the blinds are both utilized to insure that any undesirable gases are completely isolated from the catalytic reactor 3. The gas processing loop generally indicated by numeral 15 consists of some temporary piping 20 which, in the drawing, is shown as connected to the process outlet pipe 6. The valve 21 is used to open or close the flow from process pipe 6 into the temporary piping 20. Line 20 is in communication with heat exchanger 22 and line 23 leads from the heat exchanger through cooler 24 into the water removal means 25 which may be a knockout pot, an ordinary demister or other type of dryer. The dried gases flowing from the water removal means 25 flow by line 26 to the flow means 27 which may be either a compressor, fan, or a blower, which is driven by shaft 28 from motor 29 and the gas moves via line 30 back through the heat exchanger 22, to the heater 32 and from heater 32 through lines 45. Attached to line 45 is the treatment gas injection line 34 containing valve 39. A connector flange may fit with treatment gas inlet 41 so that this gas can be injected into the gas processing loop 15 and go through line 34, through line 45, through valve 46, into the inlet line 4, to catalyst reactor 3.

The gases which may be injected into the gas processing loop 15 vary according to the particular catalyst and the particular treatment to which the catalyst is to be put. Normally, however, the gases in the processing loop are purged from the system, thereafter, a carrier gas which is defined as a gas inlet to the catalyst and the desired reaction is inserted via line 35 and valve 36 from carrier inlet 37 into the gas processing loop 15. Thus, for example, as is proposed by Koppe in U.S. Pat. No. 3,609,097, the carrier gas may be steam. In some instances, the process gas itself can be used. Normally, however, a gas such as nitrogen or one of the alkanes are inserted into the gas processing loop and by means of the heater, or of the cooler, the temperature in the catalyst bed is changed to that desired. Thereafter, the treatment or reaction gases are then added, normally in small, incremental quantities until the reaction starts. Reaction can be detected when analyses of the gases from the inlet 4 and the outlet 6, show that there is some consumption of the catalyst treatment gas. As is illustrated in the drawing, the analyses are done at the control panel 50 and analytical station 50 containing lines 51 and 52 which are shown as cutoff but which may be connected to the appropriate lines from which samples are to be taken or with which controls are required.

In some other instances, the primary purpose of the catalyst treatment unit is to cool the catalyst. This is required with some hydrogenation catalysts which are in a reduced state and are normally at a relatively high process temperature and pressure. In such instances, it is necessary that the catalyst be deactivated prior to exposure to the atmosphere since they are highly pyrophoric and pose a considerable safety problem to men and equipment if oxygen is suddenly placed into contact with the adsorbed hydrogen atoms and the highly active catalytic surfaces.

In other instances, there may be a plant malfunction resulting in a runaway temperature in which this problem is magnified.

Figure 2:
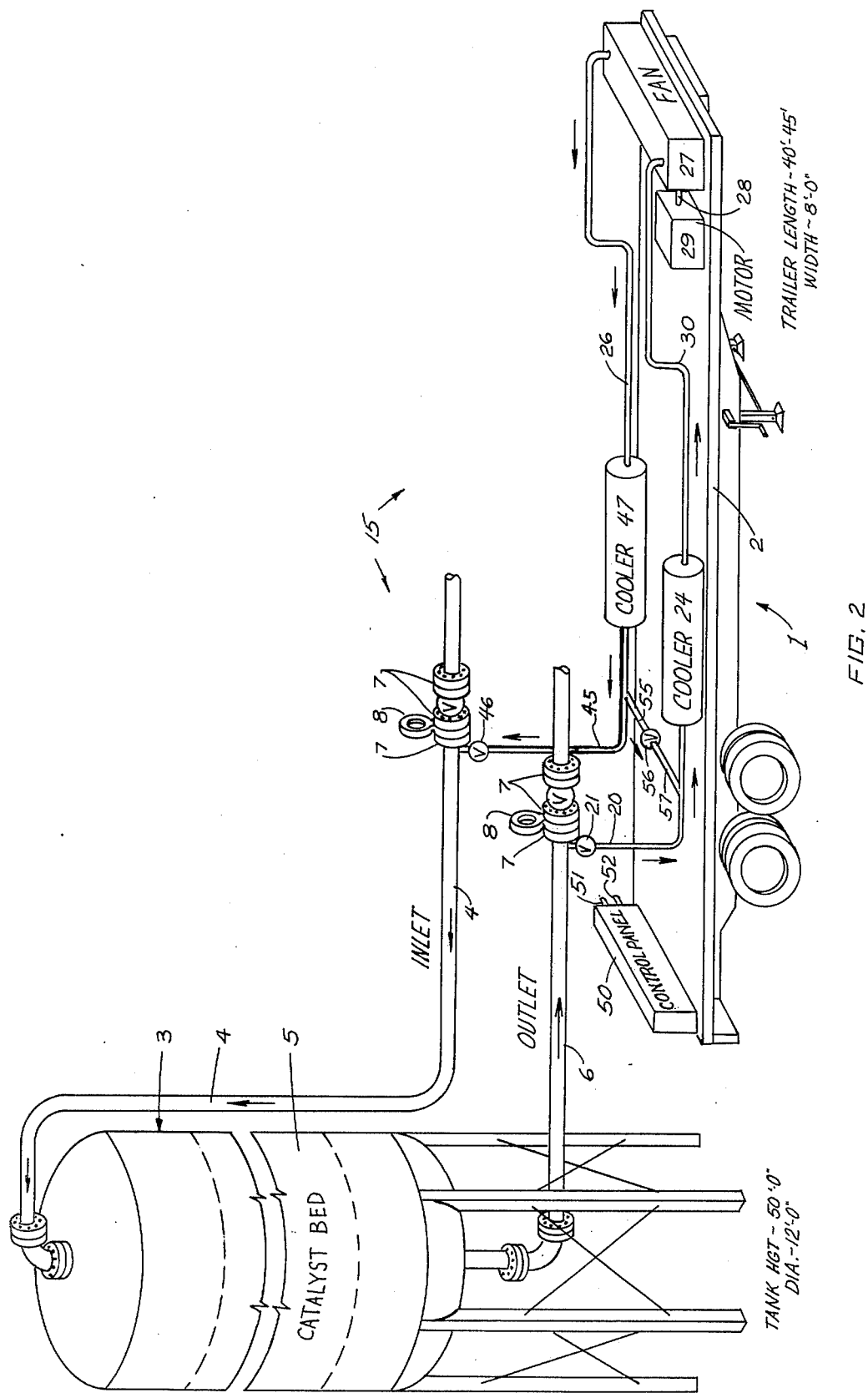
FIG. 2 is a perspective view of the mobile catalyst unit of this invention used as a cooling apparatus.

Accordingly, the mobile process cooling unit illustrated in FIG. 2, schematically, provides a tie-in with the outlet 6 of catalytic reactor 3 through piping 20 which goes to cooler 24. The cooled gas then goes to the large fan 27, driven through shaft 28 by motor 29, and the gas from the fan goes via line 26 to the post-cooler 47. The gas from the post cooler goes via line 45 back to the inlet 4. However, a bypass line is included so that a portion of the gas can go optionally through line 55 through valve 56 and line 57 back to line 20 and on to the precooler 24. This allows for a more complete cooling of the gas in the process loop 15 and prevents damage to the fan 27 by cooling the process gas more substantially than would be allowed by repiping the cooled gas through the hot catalyst in bed 5. Since most plants do not have adequate refrigeration capabilities, and have no way to circulate large quantities of cooled inert air over the catalytic reactor, a hot catalyst can be cooled and deactivated within one or two days whereas cooling through the normal equipment available in the process chain may take substantially longer. Again, the catalyst can be deactivated or cooled so that it can be safely unloaded without danger to equipment, process gases or personnel since, as has been mentioned, the catalyst in the reduced state at high temperatures is highly pyrophoric and is extremely dangerous to handle.

The invention may be better understood by reference to the attached examples.

EXAMPLE 1

This example relates to a typical reduction procedure for the copper-zinc, low-temperature CO conversion catalyst of the type described and claimed by Edward K. Dienes in U.S. Pat. No. 3,303,001. The reduction procedure for this catalyst is outlined by Ronald E. Reitmeier in U.S. Pat. No. 3,390,102.

The catalyst bed 5 is blocked from the process system by the insertion of blinds 8 in between the normal flanges 7. As is shown in the drawing, this can be at some distance away from the catalytic reactor 3 or can be much closer. The deciding factor actually is the location of the flanges and the location of other equipment which would block movement of the mobile unit 1 into position adjacent to the reactor 3. The carrier gas, which, in this case, can be nitrogen, natural gas, carbon dioxide, methane, steam or other substantially nonoxidizing gases free of components which are deleterious to the catalyst such as sulfur, oxygen or carbon monoxide is injected into the system through carrier gas inlet 37. Thus, valve 36 is opened and the gas is injected into the system. By opening valves 46 and 21, the catalyst is included in the loop system. Carrier gas is added and circulation initiated until a gas flow of at least 100 SCFH of carrier gas per CF of catalyst, (space velocity), is established. A space velocity of greater than 200 is preferred. The catalyst bed 5 is heated up gradually until the temperature of entire bed and throughout the system is at least 350° F. At this time, hydrogen, carbon monoxide or other reducing gas is introduced at a level of 0.5 percent by volume. The analytical equipment is attached via lines 51 to the inlet 4 and via lines 52 to the outlet 6 so as to confirm that there is some hydrogen consumption. This is determined by a lower concentration of hydrogen in the gas outlet 6 than is present in the inlet 4. Once the consumption of the reducing gas is confirmed, the hydrogen concentration (or other reducing gas) is slowly increased until the reducing gas concentration reaches about two percent. The analyses are carefully monitored throughout the procedure until the exit hydrogen in line 6 begins increasing and begins to approach the inlet analysis. This, of course, indicates completion of the reaction. In order to assure that the reaction is completed, the temperature of the gases and of the catalysts in catalyst bed 5 is increased to about 400° F. If no reaction is shown by the analysis, the hydrogen is increased incrementally up to 10 to 40 percent. If no further hydrogen consumption is experienced at this high concentration and at this high temperature, the reduction is complete and the catalyst is ready to be placed on stream. Normally, this series of steps would take two to three days. By use of this equipment, the reduction can be completed while other equipment is serviced in the process chain, thus eliminating a loss of two to three days production which could amount to several hundred thousand dollar savings.

EXAMPLE 2

This process can be utilized with ammonia synthesis catalyst. First, the catalyst bed 5 is blinded from the process system by insertion of the blinds 8 into the flanges 7. A carrier gas, which may be nitrogen or suitable process gases, is injected in the system through carrier gas inlet 37. A gas flow is established in the process loop 15 of greater than 100 SCFH of carrier gas per CF of catalyst and the heatup of the gases is begun until the temperature within the system reaches 600° to 650° F. At this point, hydrogen or other reducing gas is introduced through line 41 through valve 39 into the system. If the process gas is used as the carrier gas, the hydrogen, of course, is already present. The hydrogen concentration and temperature is continually increased until water evolution, which is the product of the reduction reaction, does not exceed 20,000 PPM in the outlet gas line 6. Generally, a water evolution of less than 10,000 per PPM is preferred. While maintaining the discharge water levels at this point, the hydrogen concentration and temperature is increased until the reduction reaction approaches completion. At this point, the catalyst is essentially ready to be placed on stream.

EXAMPLE 3

This example relates to the oxidation or regeneration of catalysts for purposes of removing the poisonous or deleterious compounds or materials from the surface of the catalyst. This example, which is meant to be illustrative, is applied to the low temperature catalyst such as that previously referred to by Dienes in U.S. Pat. No. 3,303,001 or by Reitmeier and Flemming in U.S. Pat. No. 3,388,972. In this case, however, the catalyst bed 5 is isolated from the system by the insertion of the blinds 8 between flanges 7. The gases in the system are purged therefrom and thereafter a carrier gas is inserted through carrier gas inlet 37 and valve 36 into the gas loop 15. The carrier gases in this system are preferably nitrogen, however carbon dioxide steam or other inert gases can be utilized. A carrier gas flow of greater than 100 SCFH/CF of catalyst is established and maintained. The gases are heated up until they reach an oxidation temperature of between 350° to 600° F. Oxygen or some other acceptable oxidizing gas is fed through line 41 through valve 39 into the gas treatment loop 15 until the oxidation process is essentially completed. For some types of these catalysts, a heat treatment is required. In these cases, the temperature is thereafter raised from 450° to 650° F. and held for the specified curing time, of from normally six to twelve hours.

Thereafter, this catalyst is ready for reduction as defined in example 1. However, it is essential that all oxidizing gases be purged from the system prior to introduction of the hydrogen.

EXAMPLE 4

The catalyst treatment unit of this system can be utilized for sulfiding, hydrotreating or hydrogenation catalysts such as cobalt, molybdenum or nickel sulfide catalysts. In this type of process, the catalyst bed 5 is isolated from the process system by addition of the blinds 8 between flanges 7 as previously indicated. A carrier gas, such as natural gas, nitrogen, process or other acceptable gases, are injected through carrier gas inlet 37 and valve 36 into the system. The flow rate of this gas through the flow means 27 is established at a minimum of 100 SCFH/CF catalyst and a heatup of the gases is begun through the heater 32 to the proper reaction temperature. The hydrogen sulfide or other sulfiding agent is bled into the carrier gas via line 41 and valve 39 and the temperatures are gradually increased and maintained in a range of 400° to 600° F. The concentration of the sulfiding agent into the process gas is from 2 to 5 percent by volume. Analysis taken through line 51 and 52 at control panel 50 show when the sulfiding reaction begins and indicate that the reaction is substantially complete when the concentration of the sulfiding agent in the outlet 6 approaches and equals that of the concentration in the inlet 4. As soon as this condition is reached, the catalyst is ready to be placed into process operation.

EXAMPLE 5

The unit of this invention can also be used for preheating or heating the catalyst within the system. In this instance, again, the catalyst bed 5 is isolated from the system by insertion of the blinds 8 between the flanges 7 in the inlet line 4 and the outlet line 6. Piping lines 20 and 45 are attached to the outlet line 6, and the inlet 4 respectively and a carrier gas is inserted through the carrier gas inlet 37 into the system. A gas flow of greater than 100 SCFH/CF of catalyst per hour is established and maintained. Heat is applied through the heater 32 until a desired level of heat in the system is reached. The heatup is continued until the desired level is reached and the catalyst is then placed on stream.

A still more serious problem, as previously mentioned, can occur when the reduced catalyst is required to be cooled or deactivated so as to be unloaded. This is particularly true where the catalyst is a reduced pyrophoric metal saturated with hydrogen which cannot be properly removed even with extensive purging.

In this instance, the piping of lines 20 and 45 are detachably connected to normal process lines 6 and 4 respectively and the catalyst bed 5 is then isolated from the process gases by insertion of the blinds 8 between flanges 7 on both lines 6 and 4. An inert gas flow is created by insertion of the inert gas and circulation by the compressor, fan or blower through the loop system.

A precooler 24 is situated in the line 20 to cool the gas sufficiently to eliminate damage to the flow means 27. The gas from flow means 27 is moved via line 26 to a post-cooler 47 and the cooled gases are then moved via line 45 into the normal inlet pipe 4 and into the catalytic reactor 3. However, in order to control the temperature to the flow means 27, a bypass path is arranged through line 55, valve 56, and line 57 back to the line 20 to the precooler. Thus, 70 percent or more of the gas can be moved back into the precooler after passing through the post-cooler 47 and into the flow means 27 until the temperature begins to become modified to that acceptable to the mechanical system. In any event, lines 55 and 57 can be closed by closure of valve 56, thus allowing for full flow of the gases through line 20 through both coolers, through line 45 back through the reactor and through the catalyst bed 5 until the catalyst in the catalyst bed begins to approach ambient temperature. It is also possible to provide for addition of deactivating gases to the carrier gas under proper circumstances. However, in cases of cool-down of catalyst bed, particularly under conditions of runaway temperature, much time can be saved and danger to equipment and personnel minimized through the use of the apparatus and process of this invention.

Many modifications will occur to those skilled in the art from the detailed description hereinabove given and such is meant to be exemplary in nature and nonlimiting except so as to be commensurate in scope with the appended claims.

We claim:
1. A catalytic gas treatment system which comprises in combination:

A. a catalytic reactor containing a stationary catalyst bed and having an inlet and an outlet means connected to other gas treatment units, and
B. a cutoff means in operative relation with said inlet means for isolating the catalytic reactor from the other gas treatment units,
C. a cutoff means in operative relation with said outlet means for isolating the catalytic reactor from the other gas treatment units,
D. an auxiliary mobile catalyst treatment unit comprising:
E. a gas processing loop supported on a mobile carrier and which is in open communication with said inlet and outlet means so as to form a flow passage through said loop and through said reactor, which loop comprises:
   a. temperature changing means mounted on said mobile carrier and serially connected in said gas loop for conditioning the fluid passing through said gas loop, and
   b. an auxiliary inlet means for addition of a carrier gas to said gas processing loop, and
   c. flow means mounted on said mobile carrier and serially connected in said gas loop, and
   d. a first conduit at one end of said loop, detachably connected to said inlet means at a point between said cutoff means and said isolated catalytic reactor,
   e. a second conduit at the other end of said loop, detachably connected to said outlet means at a point between said isolated catalytic reactor and said cutoff means,
F. whereby means are provided for establishing and recirculating a flow of carrier gas from said gas loop to said inlet means and thence through said catalytic reactor, and through said stationary catalyst bed in said reactor and thence through said outlet means back to said gas loop, said recirculation continuing until the carrier gas in said catalytic reactor is properly conditioned.

2. The system as defined in claim 1, the further combination therewith of:
A. a second auxiliary inlet means for addition of a catalyst treatment gas to said gas processing loop.

3. The system as defined in claim 1, in which the temperature changing means includes a heater.

4. The system as defined in claim 1, in which the temperature changing means includes a cooler.

5. The system as defined in claim 1, the further combination therewith of a water removal means serially connected in said gas processing loop.

6. The system as defined in claim 1, in which said gas flow means is a blower.

7. The system as defined in claim 1, in which said gas flow means is a compressor.

8. The system as defined in claim 1, the further combination therewith of a heat exchanger serially connected in said processing loop.

9. The system as defined in claim 1, the further combination therewith of monitoring means in operative relation with said gas loop.

10. The system as defined in claim 1, the further combination therewith of an analytical means in operative relation with said gas processing loop.

11. The system as defined in claim 1, in which said mobile carrier is a trailer which supports said gas processing loop and which provides mobility to the unit.

* * * * *